(12) United States Patent
Kitajima et al.

(10) Patent No.: US 8,641,578 B2
(45) Date of Patent: Feb. 4, 2014

(54) CONTROLLER OF VEHICLE DRIVE UNIT

(75) Inventors: Kei Kitajima, Toyota (JP); Hitoshi Matsunaga, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 136 days.

(21) Appl. No.: 13/060,445

(22) PCT Filed: Sep. 24, 2009

(86) PCT No.: PCT/JP2009/066523
§ 371 (c)(1),
(2), (4) Date: Feb. 24, 2011

(87) PCT Pub. No.: WO2010/041554
PCT Pub. Date: Apr. 15, 2010

(65) Prior Publication Data
US 2011/0155534 A1   Jun. 30, 2011

(30) Foreign Application Priority Data
Oct. 7, 2008   (JP) ................................ 2008-260517

(51) Int. Cl.
*F16H 61/48*   (2006.01)
(52) U.S. Cl.
USPC .......................................... 477/57; 477/180
(58) Field of Classification Search
USPC ........................................ 477/64, 62, 53, 57
See application file for complete search history.

(56) References Cited

U.S. PATENT DOCUMENTS

| | | | |
|---|---|---|---|
| 5,643,136 A * | 7/1997 | Kono et al. | 477/169 |
| 5,754,969 A | 5/1998 | Ando et al. | |
| 5,807,204 A * | 9/1998 | Shiiba et al. | 477/176 |
| 6,036,619 A * | 3/2000 | Tashiro et al. | 477/64 |
| 6,264,581 B1 | 7/2001 | Tashiro et al. | |
| 7,361,120 B2 * | 4/2008 | Iida et al. | 477/65 |
| 2002/0058565 A1* | 5/2002 | Yamamoto et al. | 477/5 |
| 2004/0157705 A1 | 8/2004 | Nobumoto et al. | |

FOREIGN PATENT DOCUMENTS

| | | |
|---|---|---|
| JP | 5 322033 | 12/1993 |
| JP | 6 193727 | 7/1994 |
| JP | 8 200493 | 8/1996 |
| JP | 2004 19812 | 1/2004 |

(Continued)

OTHER PUBLICATIONS

International Search Report issued Dec. 8, 2009 in PCT/JP09/66523 filed Sep. 24, 2009.

*Primary Examiner* — David D Le
*Assistant Examiner* — Stacey Fluhart
(74) *Attorney, Agent, or Firm* — Oblon, Spivak, McClelland, Maier & Neustadt, L.L.P.

(57) ABSTRACT

In a controller of a vehicle drive unit that is one embodiment of the present invention, a plurality of slippage control regions (regions A to C) are set based on the timing of booming noise generation that accompanies engine driving (time from when the vehicle running state enters a region until booming noise is generated) so as to actively use, for example, regions B and C where booming noise is generated if the road load comes to a balance due to a slope or the like and running is then continued and where booming noise is not immediately generated even after the vehicle running state enters the regions, so the frequency of performing lockup slippage control is increased and the fuel saving effects of the lockup slippage control are enhanced.

8 Claims, 7 Drawing Sheets

(56) References Cited

FOREIGN PATENT DOCUMENTS

| | | |
|---|---|---|
| JP | 2004 44757 | 2/2004 |
| JP | 2004 263733 | 9/2004 |
| JP | 2004 263875 | 9/2004 |
| JP | 2008 57569 | 3/2008 |
| JP | 2008 116053 | 5/2008 |
| JP | 2008 144859 | 6/2008 |

* cited by examiner

FIG.4
|     | C1 | C2 | C3 | C4 | B1 | B2 | B3 | B4 | F0 | F1 | F2 | F3 |
|-----|----|----|----|----|----|----|----|----|----|----|----|----|
| P   |    |    |    |    |    |    |    |    |    |    |    |    |
| R   |    |    | ○  |    | ◎  |    |    | ○  |    | ○  |    |    |
| N   |    |    |    |    |    |    |    |    |    |    |    |    |
| 1st | ○  |    |    | ◎  |    |    |    | ◎  | ○  |    |    | ○  |
| 2nd | ○  |    |    | ◎  |    | ◎  | ○  |    | ○  | ○  | ○  |    |
| 3rd | ○  |    | ○  | ◎  | ◎  |    | △  |    | ○  | ○  |    |    |
| 4th | ○  | ○  | △  | ◎  |    |    | △  |    | ○  |    |    |    |
| 5th | △  | ○  | ○  |    | ○  |    | △  |    |    |    |    |    |
| 6th | △  | ○  |    |    | △  | ○  | △  |    |    |    |    |    |
○ engagement
◎ engagement during engine braking
△ engagement unrelated to power transmission
FIG.5
(a)
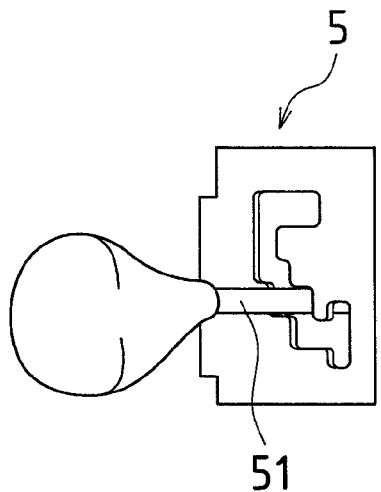
(b)
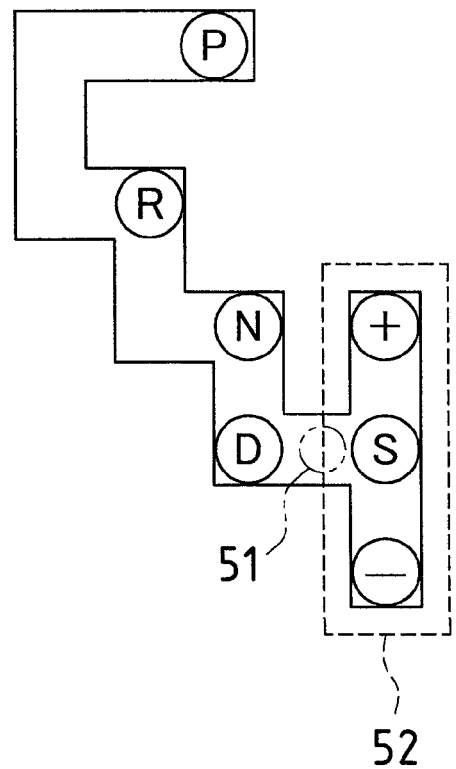

CONTROLLER OF VEHICLE DRIVE UNIT

TECHNICAL FIELD

The present invention relates to a controller of a vehicle drive unit equipped with an engine (internal-combustion engine) and a transmission, and more specifically the present invention relates to a controller of a vehicle drive unit equipped with an automatic transmission having a torque converter provided with a lockup clutch.

BACKGROUND ART

In a vehicle equipped with an engine, as a transmission that appropriately transmits torque and the speed of revolution generated by the engine to drive wheels according to the running state of the vehicle, an automatic transmission is known that automatically optimally sets a gear ratio between the engine and the drive wheels.

Examples of an automatic transmission mounted in a vehicle include a planetary gear transmission that sets a gear using frictionally engaging elements such as a clutch and a brake and a planetary gear apparatus, and a belt-driven stepless transmission (CVT: Continuously Variable Transmission) that steplessly adjusts the gear ratio.

In a vehicle in which a planetary gear-type automatic transmission is mounted, a gearshift map that has gearshift lines (gear switching lines) for obtaining an optimal gear according to the vehicle speed and the accelerator opening degree (or throttle opening degree) is stored in an ECU (Electronic Control Unit) or the like, a target gear is calculated with reference to the gearshift map based on the vehicle speed and the accelerator opening degree, and based on that target gear, a gear (selected gear) is automatically set by engaging or disengaging a clutch, a brake, a one-way clutch, and the like, which are frictionally engaging elements, in a predetermined state.

In the configuration of a belt-driven stepless transmission, a belt is wrapped around a primary pulley (input side pulley) and a secondary pulley (output side pulley) that are provided with a pulley groove (V groove), and by reducing the groove width of one pulley while increasing the groove width of the other pulley, the contact radius (effective diameter) of the belt to each of the pulleys is continuously changed to steplessly set a gear ratio.

In a vehicle equipped with such an automatic transmission, a torque converter is disposed in a power transmission path from the engine to the automatic transmission. The torque converter, for example, is provided with a pump impeller connected to an engine output shaft (crankshaft), a turbine runner connected to an input shaft of the automatic transmission, and a stator provided between the pump impeller and the turbine runner via a one-way clutch. The torque converter is a hydraulic transmission apparatus in which the pump impeller rotates according to rotation of the engine output shaft, and the turbine runner is rotationally driven by operating oil discharged from the pump impeller, thus transmitting engine output torque to the input shaft of the automatic transmission.

The torque converter is provided with a lockup clutch that directly connects its input side (pump side) and output side (turbine side), and lockup engagement control is executed to bring the lockup clutch into engagement so as to directly connect the input side and the output side of the torque converter. Lockup slippage control (flex lockup control) is also executed to bring the lockup clutch into half-engagement that is intermediate between engagement and disengagement (see, for example, Patent Documents 1 and 2). By executing such lockup engagement control and lockup slippage control, an improvement in fuel economy can be achieved.

The lockup engagement control as used herein (hereinafter, it may be simply referred to as "engagement control") uses a map in which a lockup engagement region (lockup-on region) and a disengagement region (lockup-off region) are set using vehicle running state parameters such as vehicle speed and throttle opening degree and brings the lockup clutch into engagement or disengagement based on the actual vehicle running state (for example, vehicle speed and throttle opening degree) in reference to the map.

Also, the lockup slippage control (hereinafter, it may be simply referred to as "slippage control") similarly uses a map in which a lockup slippage region and a disengagement region are set using vehicle running state parameters such as vehicle speed and throttle position and brings the lockup clutch into slipping (half-engagement) or disengagement based on the actual vehicle running state (for example, a vehicle speed and a throttle position) in reference to the map.

CITATION LIST

Patent Literature

[PTL 1] JP 2004-263875A
[PTL 2] JP 2004-263733A
[PTL 3] JP 2008-144859A

DISCLOSURE OF INVENTION

Technical Problems

In vehicles equipped with an engine, rotational fluctuation due to the torque fluctuation of the engine resulting from cyclical ignition (explosion) in the cylinders of the engine and the reciprocating movement of the pistons serves as a source of force (vibration force) and creates torsional vibrations in the drive train (power train) from the crankshaft to the drive wheels that transmits engine torque, and such vibrations are amplified by torsional resonance of the drive train at specific engine rotational speeds, generating vibrations and booming noise in respective parts of the vehicles.

To prevent generation of such booming noise of a drive train and damage to a lockup clutch caused by continuous slip control, neither lockup engagement control nor lockup slippage control is executed in a low vehicle speed/high accelerator opening degree region (conventional control). Therefore, in conventional control, the region where lockup engagement control and lockup slippage control can be executed is small, thereby failing to sufficiently give the fuel saving effects of the lockup engagement control and the lockup slippage control.

The present invention has been made in view of such circumstances, and an object of the present invention is to attain a controller of a vehicle drive unit that can increase the frequency of executing lockup engagement control and lockup slippage control while inhibiting booming noise generation.

Means for Solving the Problems

The present invention is based on a controller of a vehicle drive unit equipped with an engine, a transmission, and a lockup clutch, and in one aspect, such a controller of a vehicle drive unit is equipped with a slippage control means for controlling slippage of the lockup clutch, and as a region where the slippage control means is performed, a slippage control region that takes in consideration a timing of booming noise generation that accompanies driving of the engine is set.

In this configuration, the timing of booming noise generation is a time from when a vehicle running state enters the slippage control region until booming noise is generated, and a slippage control is initiated when a vehicle running state enters the slippage control region, and the slippage control is terminated when the timing of booming noise generation is reached. In this configuration, a plurality of slippage control regions having different booming noise generation timings may be set.

According to this configuration, a slippage control region that takes in consideration a timing of booming noise generation that accompanies driving of the engine is set as a region where the slippage control means is performed, so the frequency of executing lockup slippage control can be increased and the fuel saving effects of lockup slippage control can be enhanced.

For specific description, in conventional control, lockup slippage control is avoided in a region where booming noise is generated if running is continued under a condition where the road load comes to a balance due to a slope or the like (running in a lockup slippage state), but in this configuration, such a region, i.e., a region where booming noise is not immediately generated after entering the region, is actively used and a slippage control region is set such that lockup slippage control can be executed until booming noise is generated (until a booming noise generating timing is reached) even when the vehicle running state continues to be in this region, and it is thus possible to enhance the fuel saving effects of the lockup slippage control. Also, in a case of normal running with which the aforementioned region (a region where booming noise is generated when the vehicle running state stays there for a long period of time) is traversed quickly, the lockup slippage control is continuously executed from the time of entrance into the region, and therefore in this case as well it is possible to enhance the fuel saving effects of the lockup slippage control.

As for a specific configuration of this aspect, the slippage control region is set using a vehicle speed and a throttle opening degree (accelerator opening degree) as parameters, and the slippage control region is set to be on a lower vehicle speed side and/or a higher throttle opening degree (higher accelerator opening degree) side relative to a slippage control region that is normally set. In addition, as for another specific configuration, the slippage control region is set using a vehicle speed and a driving force (engine driving force) as parameters, and the slippage control region is set to be on a lower vehicle speed side and/or a greater driving force side relative to a slippage control region that is normally set.

Another solving means of the present invention is directed to a vehicle drive unit equipped with an engine, a transmission, and a lockup clutch, and includes a configuration in which a controller of such a vehicle drive unit is equipped with an engagement control means for controlling engagement of the lockup clutch, and an engagement control region that takes in consideration a timing of booming noise generation that accompanies driving of the engine is set as a region where the engagement control means is performed.

In this configuration, the timing of booming noise generation is a time from when a vehicle running state enters the engagement control region until booming noise is generated, and engagement control is initiated when a vehicle running state enters the engagement control region, and the engagement control is terminated when the timing of booming noise generation is reached. In this configuration, a plurality of engagement control regions having different booming noise generation timings may be set.

According to this configuration, an engagement control region that takes in consideration a timing of booming noise generation that accompanies driving of an engine is set as a region where the engagement control means is performed, so the frequency of executing lockup engagement control can be increased and the fuel saving effects of lockup engagement control can be enhanced.

For specific description, in conventional control, lockup engagement control is avoided in a region where booming noise is generated if running is continued under a condition where the road load comes to a balance due to a slope or the like (running in a lockup engagement state), but in this configuration, such a region, i.e., a region where booming noise is not immediately generated after entering the region is actively used and an engagement control region is set such that lockup engagement control can be executed until booming noise is generated (until a booming noise generating timing is reached) even if the vehicle running state continues to be in this region, and it is thus possible to enhance the fuel saving effects of the lockup engagement control. Also, in a case of normal running with which the aforementioned region (a region where booming noise is generated if the vehicle running state stays there for a long period of time) is traversed quickly, the lockup engagement control is continuously executed from the time of entrance into the region, and therefore in this case as well it is possible to enhance the fuel saving effects of the lockup engagement control.

As for a specific configuration of this aspect, the engagement control region is set using a vehicle speed and a throttle opening degree (accelerator opening degree) as parameters, and the engagement control region is set to be on a lower vehicle speed side and/or a higher throttle opening degree (higher accelerator opening degree) side relative to an engagement control region that is normally set. In addition, as for another specific configuration of the invention, the aforementioned engagement control region is set using a vehicle speed and a driving force (engine driving force) as parameters, and the engagement control region is set to be on a lower vehicle speed side and/or a greater driving force side relative to an engagement control region that is normally set.

Effects of the Invention

According to the present invention, in a controller of a vehicle drive unit equipped with an engine, a transmission, and a lockup clutch, the frequency of executing lockup slippage control can be increased and the fuel saving effects of the lockup slippage control can be enhanced.

Also, according to the present invention, in a controller of a vehicle drive unit equipped with an engine, a transmission, and a lockup clutch, the frequency of executing lockup engagement control can be increased and the fuel saving effects of the lockup engagement control can be enhanced.

BRIEF DESCRIPTION OF DRAWINGS

FIG. 4 is an operation table of the automatic transmission shown in FIG. 3.

FIG. 5 includes a perspective view (a) of relevant parts of a shift operation apparatus and a shift gate (b) of the shift operation apparatus.

FIG. 6 is a block diagram that shows the configuration of a control system of an ECU and the like.

BEST MODE FOR CARRYING OUT THE INVENTION

Description of Embodiments

Hereinafter, embodiments of the present invention will be described with reference to the drawings.

Figure 1:
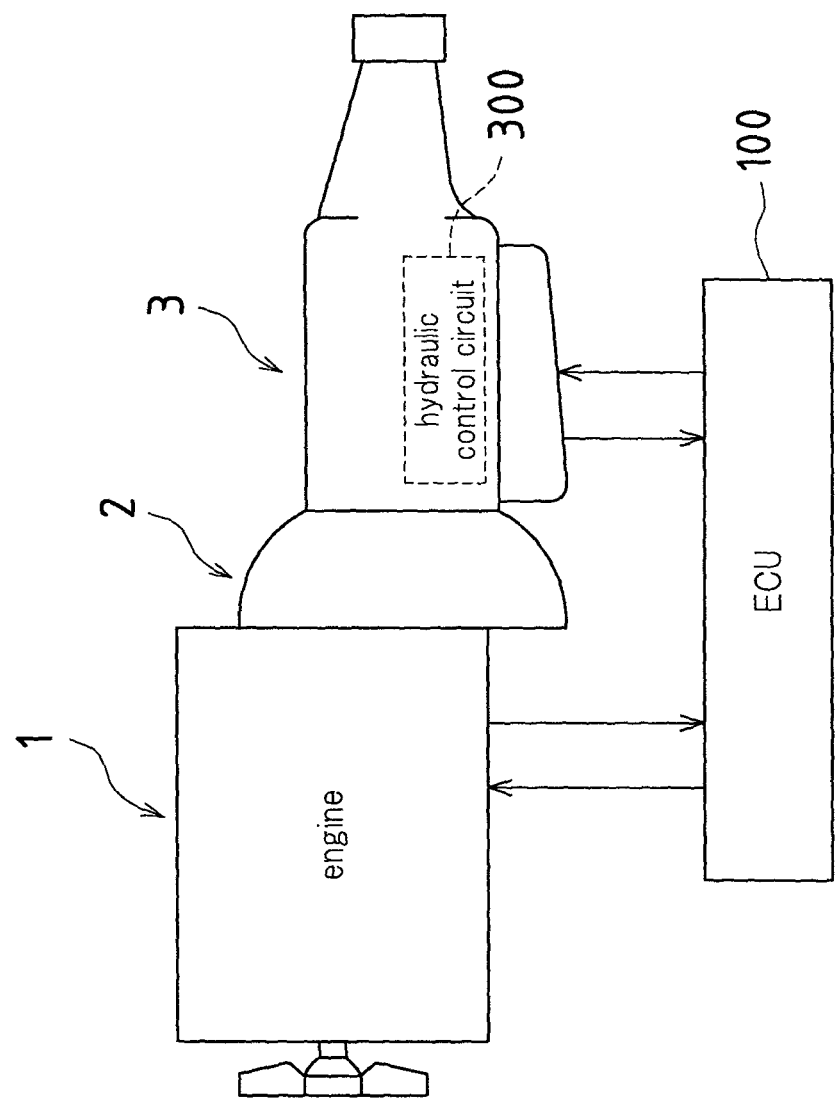
FIG. 1 is a schematic configuration view that shows part of a vehicle drive unit to which the present invention is applied.

FIG. 1 is a schematic configuration view that shows a vehicle drive unit to which the present invention is applied.

The vehicle drive unit in this example is for use in an FR (front engine/rear drive) configuration, and is provided with an engine 1, an automatic transmission 3 having a torque converter 2, an ECU 100, and so forth, and the vehicle drive unit controller of the present invention is realized by a program executed by the ECU 100. Each of the engine 1, the torque converter 2, the automatic transmission 3, and the ECU 100 will be described below.

—Engine—

Figure 2:
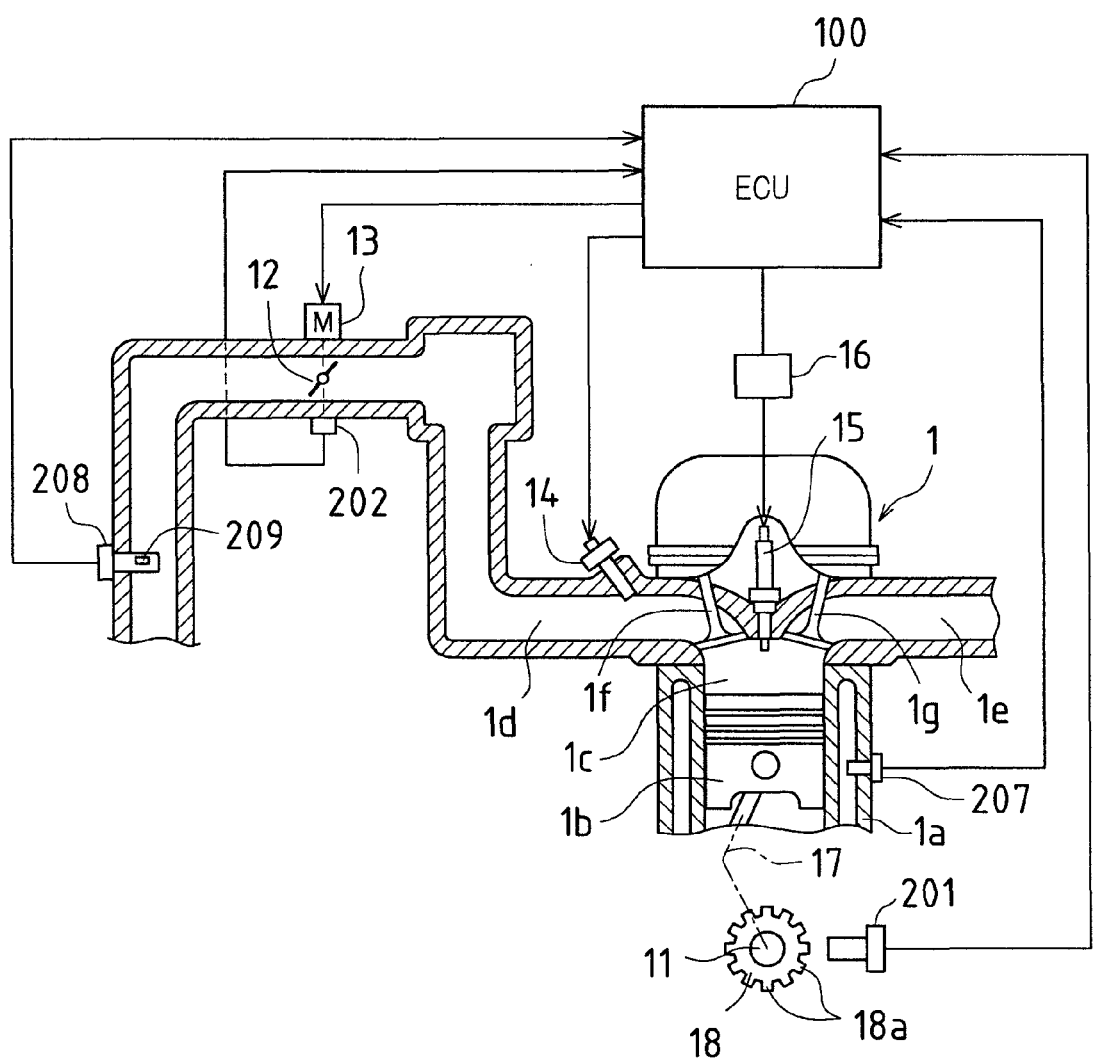
FIG. 2 is a schematic configuration view of an engine applied to the vehicle drive unit of FIG. 1.

The engine 1, for example, is a 4-cylinder gasoline engine, and as shown in FIG. 2, is provided with a piston 1b that moves back and forth in the vertical direction within a cylinder block 1a that constitutes each cylinder. The piston 1b is connected to a crankshaft 11 via a connecting rod 17, and back-and-forth movement of the piston 1b is converted to rotation of the crankshaft 11 by the connecting rod 17. The crankshaft 11 is connected to an input shaft of the torque converter 2.

Revolutions (engine revolutions Ne) of the crankshaft 11 are detected by an engine revolutions sensor 201. The engine revolutions sensor 201, for example, is an electromagnetic pickup, and generates a pulse-like signal (output pulse) that corresponds to protrusions 18a of a signal rotor 18 when the crankshaft 11 rotates.

A water temperature sensor 207 that detects an engine water temperature (coolant temperature) is disposed in the cylinder block 1a of the engine 1. An ignition plug 15 is disposed in a combustion chamber 1c of the engine 1. Ignition timing of the ignition plug 15 is adjusted by an igniter 16. The igniter 16 is controlled by the ECU 100.

An intake path 1d and an exhaust path 1e are connected to the combustion chamber 1c of the engine 1. An intake valve 1f is provided between the intake path 1d and the combustion chamber 1c, and by driving the intake valve 1f open/closed, the intake path 1d and the combustion chamber 1c are put in communication with or blocked from each other. Also, an exhaust valve 1g is provided between the combustion chamber 1c and the exhaust path 1e, and by driving the exhaust valve 1g open/closed, the combustion chamber 1c and the exhaust path 1e are put in communication with or blocked from each other. Driving to open/close the intake valve 1f and the exhaust valve 1g is performed by respective rotation of an intake cam shaft and an exhaust cam shaft, to which rotation of the crankshaft 11 is transmitted.

A hot wire airflow meter (intake air amount sensor) 208, an intake temperature sensor 209 (built into the airflow meter 208), and an electronically controlled throttle valve 12 that adjusts the intake air amount of the engine 1 are disposed in the intake path 1d. The throttle valve 12 is driven by a throttle motor 13. The throttle valve 12 is capable of electronically controlling a throttle opening degree independent of accelerator pedal operation by the driver, and the opening degree (throttle opening degree) is detected by a throttle opening degree sensor 202. Also, the throttle motor 13 is driven/controlled by the ECU 100.

Specifically, the throttle opening degree of the throttle valve 12 is controlled such that it is possible to obtain an optimal intake air amount (target intake amount) according to the operating state of the engine 1, such as the engine revolutions Ne detected by the engine revolutions sensor 201 and the amount the accelerator pedal is depressed (accelerator opening degree) by the driver. More specifically, the actual throttle opening degree of the throttle valve 12 is detected using the throttle opening degree sensor 202, and feedback control of the throttle motor 13 of the throttle valve 12 is performed such that the actual throttle opening degree matches the throttle opening degree at which the above target intake amount can be obtained (target throttle opening degree).

An injector (fuel injection valve) 14 for fuel injection is disposed in the intake path 1d. Fuel at a specific pressure is supplied from a fuel tank to the injector 14 by a fuel pump, and fuel is injected into the intake path 1d. This injected fuel is mixed with intake air to become a mixture and is introduced into the combustion chamber 1c of the engine 1. The mixture (fuel+air) that has been introduced into the combustion chamber 1c is ignited by the ignition plug 15 and burns/explodes. Due to burning/explosion of this mixture within the combustion chamber 1c, the piston 1b moves back and forth; thus, the crankshaft 11 rotates. The above operating state of the engine 1 is controlled by the ECU 100.

—Torque Converter—

Figure 3:
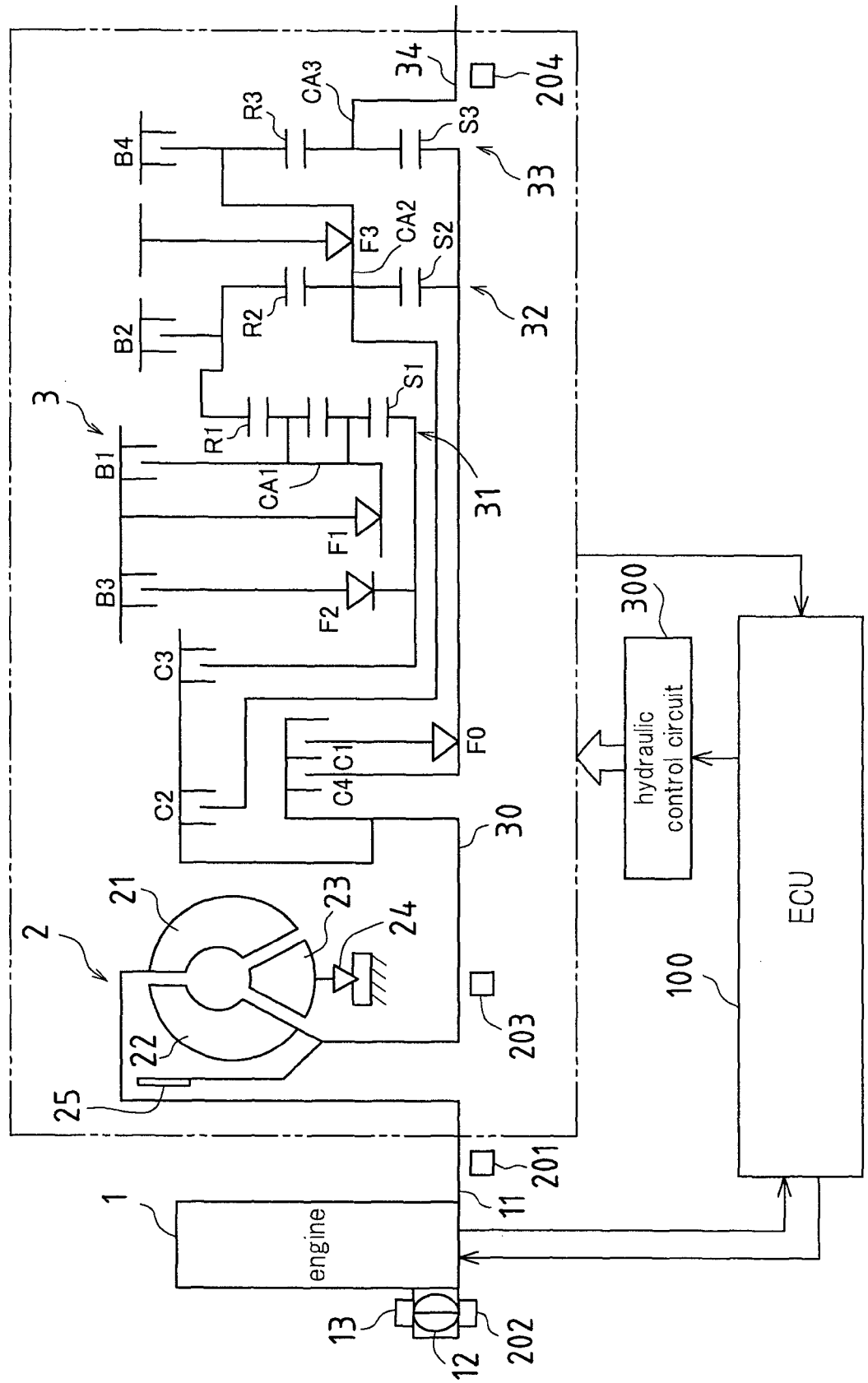
FIG. 3 shows both a schematic configuration view and a control system block diagram of an engine, a torque converter, and an automatic transmission applied to the vehicle drive unit of FIG. 1.

As shown in FIG. 3, the torque converter 2 is provided with an input shaft-side pump impeller 21, an output shaft-side turbine runner 22, a stator 23 that exhibits a torque amplification function, and a one-way clutch 24, and transmits power via a fluid between the pump impeller 21 and the turbine runner 22.

A lockup clutch 25 that establishes a state in which the input side and the output side are directly connected is provided in the torque converter 2, and by completely engaging the lockup clutch 25, the pump impeller 21 and the turbine runner 22 rotate together as a single body. Also, by engaging the lockup clutch 25 in a specific slippage state, during driving, the turbine runner 22 rotates following the pump impeller 21 with a specific amount of slippage. The torque converter 2 and the automatic transmission 3 are connected by a rotating shaft. Turbine revolutions Nt of the torque converter 2 are detected by a turbine revolutions sensor 203. Engagement/disengagement of the lockup clutch 25 of the torque converter 2 is controlled by the hydraulic control circuit 300 and the ECU 100.

—Automatic Transmission—

As shown in FIG. 3, the automatic transmission 3 is a planetary gear transmission provided with a double pinion-type first planetary gear apparatus 31, a single pinion-type second planetary gear apparatus 32, and a single pinion-type third planetary gear apparatus 33. Power output from an output shaft 34 of the automatic transmission 3 is transmitted to drive wheels via a propeller shaft, a differential gear, a drive shaft, and so forth.

A sun gear S1 of the first planetary gear apparatus 31 of the automatic transmission 3 is selectively connected to an input shaft 30 via a clutch C3. Also, the sun gear S1 is selectively connected to a housing via a one-way clutch F2 and a brake B3; thus, rotation in the reverse direction (opposite direction as rotation of the input shaft 30) is blocked. A carrier CA1 of the first planetary gear apparatus 31 is selectively connected to the housing via a brake B1, and rotation in the reverse direction is always blocked by a one-way clutch F1 provided parallel to the brake B1. A ring gear R1 of the first planetary gear apparatus 31 is connected as a single body to a ring gear R2 of the second planetary gear apparatus 32, and is selectively connected to the housing via a brake B2.

A sun gear S2 of the second planetary gear apparatus 32 is connected as a single body to a sun gear S3 of the third planetary gear apparatus 33, and is selectively connected to the input shaft 30 via a clutch C4. Also, the sun gear S2 is selectively connected to the input shaft 30 via a one-way clutch F0 and a clutch C1; thus, rotation in the reverse direction relative to rotation of the input shaft 30 is blocked.

A carrier CA2 of the second planetary gear apparatus 32 is connected as a single body to a ring gear R3 of the third planetary gear apparatus 33, and selectively connected to the input shaft 30 via a clutch C2, and also is selectively connected to the housing via a brake B4. Also, rotation of the carrier CA2 in the reverse direction is always blocked by a one-way clutch F3 provided parallel to the brake B4. A carrier CA3 of the third planetary gear apparatus 33 is connected as a single body to the output shaft 34. Rotations of the output shaft 34 are detected by an output shaft revolutions sensor 204.

The engagement/disengagement states of the clutches C1 to C4, brakes B1 to B4, and one-way clutches F0 to F3 of the above automatic transmission 3 are shown in the operation table in FIG. 4. In the operation table in FIG. 4, '○' indicates engagement and a blank space indicates disengagement. Also, '◎' indicates engagement during engine braking, and 'Δ' indicates engagement unrelated to power transmission.

As shown in FIG. 4, in the automatic transmission 3 in this example, in a first (1st) forward gear, the clutch C1 is engaged, and the one-way clutches F0 and F3 operate. In a second forward gear (2nd), the clutch C1 and the third brake B3 are engaged, and the one-way clutches F0, F1, and F2 operate.

In a third forward gear (3rd), the clutches C1 and C3 are engaged, the brake B3 is engaged, and the one-way clutches F0 and F1 operate. In a fourth forward gear (4th), the clutches C1, C2, and C3 are engaged, the brake B3 is engaged, and the one-way clutch F0 operates.

In a fifth forward gear (5th), the clutches C1, C2, and C3 are engaged, and the brakes B1 and B3 are engaged. In a sixth forward gear (6th), the clutches C1 and C2 are engaged, and the brakes B1, B2, and B3 are engaged. In a reverse gear (R), the clutch C3 is engaged, the brake B4 is engaged, and the one-way clutch F1 operates.

In this way, in the automatic transmission 3 in this example, a gear (selected gear) is set by engaging or disengaging the clutches C1 to C4, the brakes B1 to B4, the one-way clutches F0 to F3, and the like, which are frictionally engaging elements, in a specific state. Engagement/disengagement of the clutches C1 to C4 and the brakes B1 to B4 is controlled by the hydraulic control circuit 300 and the ECU 100.

—Shift Operation Apparatus—

On the other hand, a shift apparatus 5 as shown in FIG. 5 is disposed near a driver's seat of the vehicle. A shift lever 51 is provided in the shift apparatus 5 so as to be displaceable.

In the shift operation apparatus 5 in this example, a P (parking) position, an R (reverse) position, an N (neutral) position, and a D (drive) position are set, and the driver can displace the shift lever 51 to a desired position. A shift position sensor 206 (see FIG. 6) performs detection at the respective positions of the P position, the R position, the N position, and the D position (including both an upshift (+) position and a downshift (−) position of an S position described below).

The P position and the N position are non-travel positions selected when not causing the vehicle to travel, and the R position and the D position are travel positions selected when causing the vehicle to travel.

When the P position is selected with the shift lever 51, as shown in FIG. 4, the clutches C1 to C4, the brakes B1 to B4, and the one-way clutches F0 to F3 of the automatic transmission 3 are all disengaged, and the output shaft 34 is locked by a parking mechanism (not shown). When the N position is selected, the clutches C1 to C4, the brakes B1 to B4, and the one-way clutches F0 to F3 of the automatic transmission 3 are all disengaged.

When the D position is selected, the automatic gearshift mode, according to the vehicle operating state or the like, gearshift control of the plurality of forward gears (six forward gears) of the automatic transmission 3 is performed automatically. When the R position is selected, the automatic transmission 3 is switched to the reverse gear.

Also, as shown in FIG. 5b, an S (sequential) position 52 is provided in the shift operation apparatus 5, and when the shift lever 51 has been operated to the S position 52, the sequential mode (manual gearshift mode), in which gearshift operations are manually performed, is set. When the shift lever 51 is operated to upshift (+) or downshift (−) in the sequential mode, the forward gear of the automatic transmission 3 is increased or decreased. Specifically, each time that the shift lever 51 is operated to upshift (+), the gear is increased by one (e.g., 1st→2nd→ ... →6th). On the other hand, each time that the shift lever 51 is operated to downshift (−), the gear is decreased by one (e.g., 6th→5th→ ... →1st).

—ECU—

Figure 6:
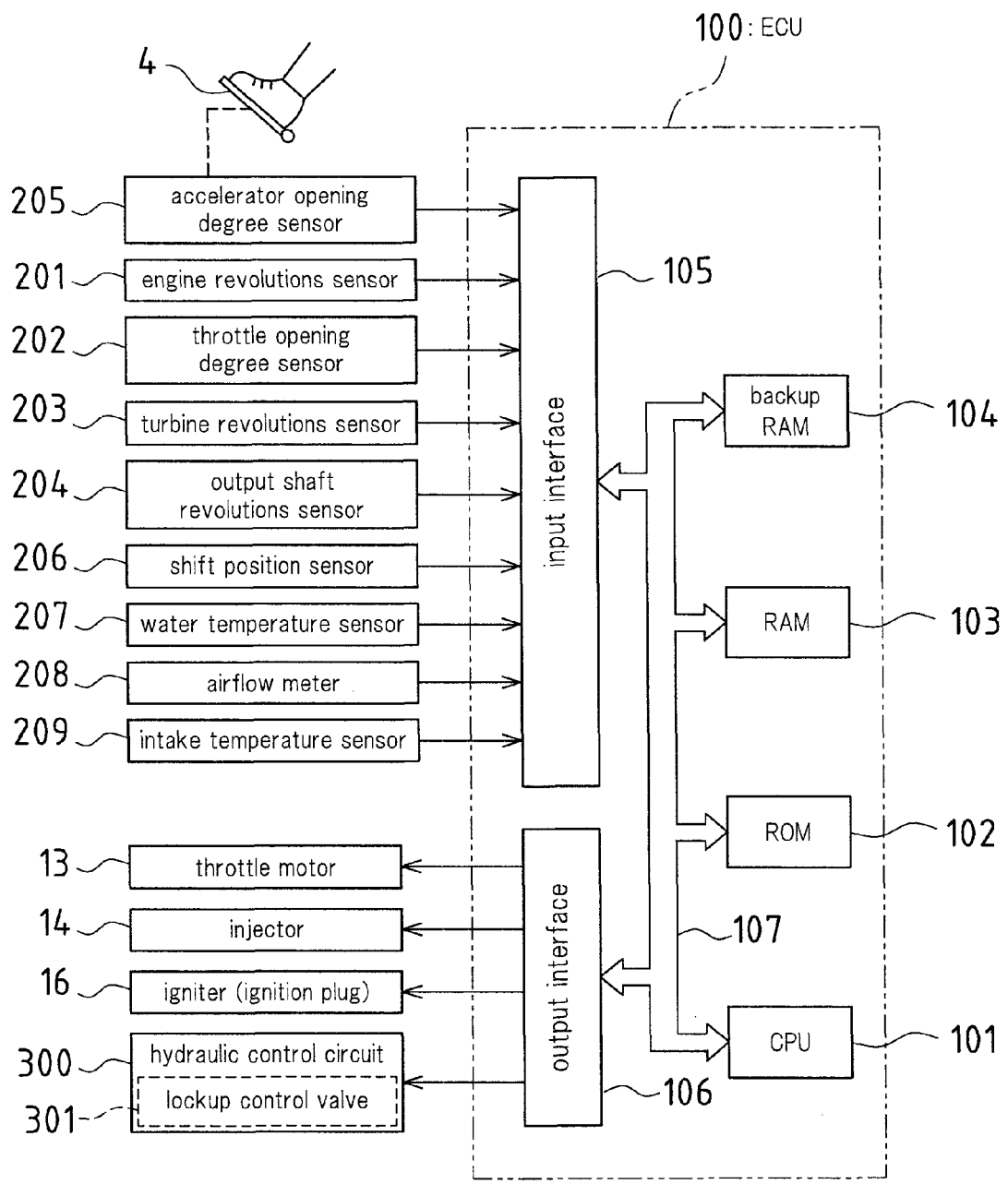

The ECU 100, as shown in FIG. 6, is provided with a CPU 101, a ROM 102, a RAM 103, a backup RAM 104, and so forth.

Various programs or the like are stored in the ROM 102, including programs for executing control related to basic driving of the vehicle, and also programs for executing gearshift control that sets the gear of the automatic transmission 3 according to the vehicle running state. The specific content of this gearshift control will be described later.

The CPU 101 executes various computational processing based on the various control programs and maps stored in the ROM 102. The RAM 103 is a memory that temporarily stores the results of computational processing with the CPU 101, data that has been input from sensors, and so forth. The backup RAM 104 is a nonvolatile memory that stores data or the like to be saved when stopping the engine 1.

The CPU 101, the ROM 102, the RAM 103, and the backup RAM 104 are connected to each other via a bus 107, and are connected to an input interface 105 and an output interface 106.

The engine revolutions sensor 201, the throttle opening degree sensor 202, the turbine revolutions sensor 203, the output shaft revolutions sensor 204, an accelerator opening degree sensor 205 that detects the opening degree of an accelerator pedal 4, the shift position sensor 206, the water temperature sensor 207, the airflow meter (intake air amount sensor) 208, the intake temperature sensor 209, and so forth are connected to the input interface 105, and signals from each of these sensors are input to the ECU 100.

The throttle motor 13 of the throttle valve 12, the injector 14, the igniter 16 of the ignition plug 15, the hydraulic control circuit 300, and so forth are connected to the output interface 106.

The ECU 100, based on the output signals of the various sensors above, executes various control of the engine 1, including control of the opening degree of the throttle valve 12 of the engine 1, control of ignition timing (control of driving of the igniter 16), control of the fuel injection amount (control of opening/closing of the injector 14), and so forth.

Also, the ECU 100 outputs a solenoid control signal (hydraulic command signal) that sets the gear of the automatic transmission 3 to the hydraulic control circuit 300. Based on this solenoid control signal, excitation/non-excitation or the like of a linear solenoid valve or on-off solenoid valve of the hydraulic control circuit 300 is controlled to engage or disengage the clutches C1 to C4, the brakes B1 to B4, the one-way clutches F0 to F3, and so forth of the automatic transmission 3 in a specific state, so as to configure a specific gear (1st to 6th gear).

Furthermore, the ECU 100 outputs a lockup clutch control signal (hydraulic command signal) to the hydraulic control circuit 300. Based on this lockup clutch control signal, a lockup control valve 301 or the like of the hydraulic control circuit 300 is controlled so that the lockup clutch 25 of the torque converter 2 is engaged, half-engaged, or disengaged.

Following is a description of "gearshift control", "lockup slippage control", and "lockup engagement control" that are executed by the ECU 100 above.

—Gearshift Control—

First, a gearshift map used in the gearshift control of this example will be described with reference to FIG. 7.

Figure 7:
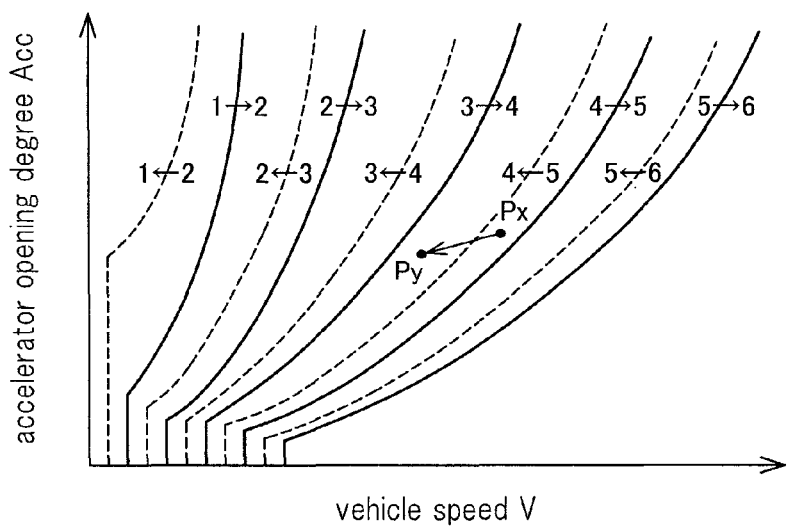
FIG. 7 shows an example of a map used for gearshift control.

The gearshift map shown in FIG. 7 is a map in which are set a plurality of regions for, using a vehicle speed V and an accelerator opening degree Acc as parameters, calculating an appropriate gear (gear in which optimal fuel consumption is obtained) according to the vehicle speed V and the accelerator opening degree Acc. This gearshift map is stored in the ROM 102 of the ECU 100. The regions of the gearshift map are demarcated by a plurality of gearshift lines (gear switching lines).

In the gearshift map shown in FIG. 7, upshift lines (gearshift lines) are indicated by solid lines, and downshift gearshift lines are indicated by broken lines. Also, the respective switching directions of upshifts and downshifts are indicated using numerals and arrows in FIG. 7.

Next is a description of basic operation of the gearshift control.

The ECU 100 calculates a vehicle speed V from an output signal of the output shaft revolutions sensor 204, calculates an accelerator opening degree Acc from an output signal of the accelerator opening degree sensor 205, refers to the gearshift map in FIG. 7 to calculate a target gear based on the vehicle speed V and the accelerator opening degree Acc, and determines whether or not a gearshift operation is necessary by comparing that target gear to the current gear.

Based on the result of that determination, when a gearshift is not necessary (when the target gear and the current gear are the same, so the gear is appropriately set), a solenoid control signal (hydraulic command signal) that maintains the current gear is output to the hydraulic control circuit 300.

On the other hand, when the target gear and the current gear are different, gearshift control is performed. For example, in a case where the vehicle running state has changed from a circumstance in which the vehicle is running with the gear of the automatic transmission 3 in "5th", i.e., there has been a change from point Px to point Py shown in FIG. 7 for example, because this change crosses over a downshift gearshift line [5→4], the target gear calculated from the gearshift map is "4th", so a solenoid control signal (hydraulic command signal) that sets 4th gear is output to the hydraulic control circuit 300, and a gearshift from the 5th gear to the 4th gear (5th→4th downshift gearshift) is performed.

—Lockup Slippage Control—

First, in this example, when the vehicle running state (such as a vehicle speed V and a throttle opening degree θth) is in a lockup slippage control region, lockup slippage control that brings the lockup clutch 25 into a state of slipping (half-engaged state) is executed.

Specifically, whether the vehicle running state is in a lockup slippage control region or a disengagement region is determined based on the actual vehicle speed V and the actual throttle opening degree θth using a map (details will be described later) in which lockup slippage control regions and a disengagement region (lockup-off region) are set using a vehicle speed V and a throttle opening degree θth as parameters, and control to bring the lockup clutch 25 into a state of slipping or into a disengaged state by controlling the lockup control valve 301 is executed so as to perform the operation of the determined region. The actual vehicle speed V is calculated from an output signal of the output shaft revolutions sensor 204, and the actual throttle opening degree θth is calculated from an output signal of the throttle opening degree sensor 202.

Meanwhile, in conventional control, to prevent generation of booming noise or the like in the drive train that accompanies engine driving, a small lockup slippage control region is set. Specific description will now be given on this point.

As a characteristic of booming noise that accompanies engine driving, booming noise tends to be generated when running in a certain region continues. For example, booming noise is generated in a situation of steady-state running on a gentle slope for a long period of time (situation where the accelerator opening degree (throttle opening degree) and the road load of the gentle slope are in balance). The vehicle running state may sometimes enter the same region (region where booming noise is generated when running is continued for a long period of time) during normal running such as gentle acceleration on a flat road that accounts for most of the running situations, but the time spent in the region is short and the problem of booming noise does not arise, so it is possible to execute lockup slippage control in such a situation. Also, lockup slippage control can be performed until booming noise is generated even when the vehicle running state is in such a region. However, in conventional control, a lockup slippage control region is unexceptionally set based on vehicle speed V and throttle opening degree θth, so it is not possible to differentiate a case where the road load comes to a balance in the aforementioned region (region where booming noise is generated when running is continued for a long period of time) from a case where lockup slippage control can be performed even when the vehicle driving state is in that region. Therefore, to prioritize prevention of booming noise generation, a small lockup slippage control region is set at the expense of enhancement of fuel economy by lockup slippage control.

To address this point, a feature of this example is the broadening of a region where lockup slippage control is executed by actively using a region where booming noise is generated when the road load comes to a balance due to a slope or the like and running is then continued and where booming noise is not immediately generated even when the vehicle running state is in the region. A specific example thereof will now be described in reference to FIG. 8.

Figure 8:
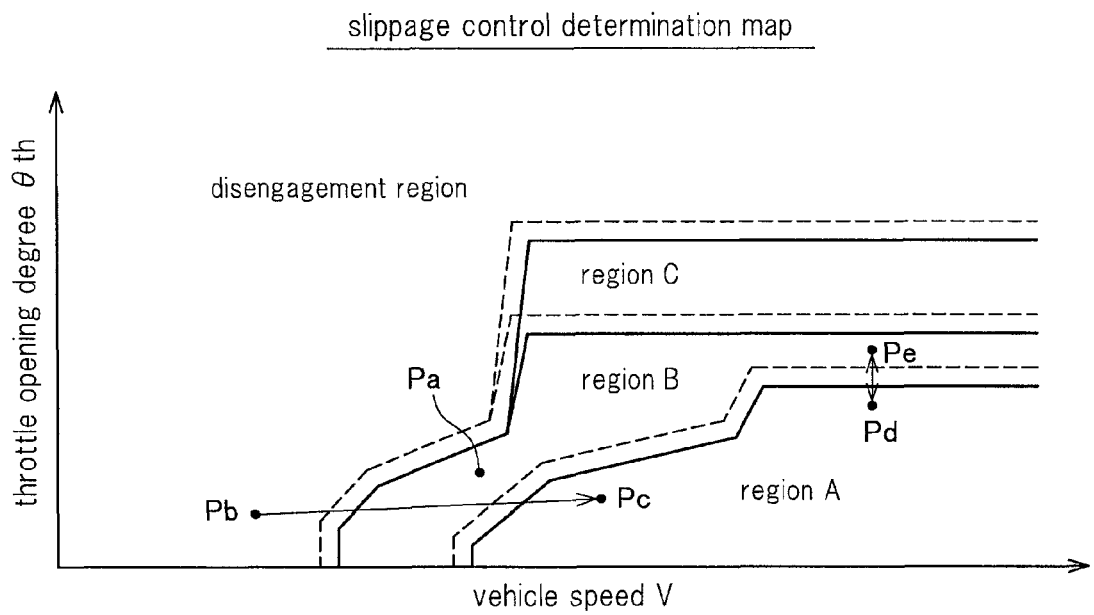
FIG. 8 shows an example of a map for use in lockup slippage control.

The map shown in FIG. 8 is a slippage control determination map (two-dimensional map) for, using a vehicle speed V and a throttle opening degree θth as parameters, determining if the lockup clutch 25 is to be slipped (semi-engaged) or disengaged according to the vehicle speed V and the throttle opening degree θth. A plurality (3) of lockup slippage control regions A to C are set.

On the slippage control determination map in FIG. 8, as shown with dashed lines provided in relation to solid lines, hysteresis is provided for each of the determination between the lockup slippage control region A and the lockup slippage control region B, the determination between the lockup slippage control region B and the lockup slippage control region C, and the determination between the lockup slippage control region C and the disengagement region. A solid line is a determination line used when the vehicle speed/throttle opening degree is increased, and a dashed line is a determination line used when the vehicle speed/throttle opening degree is decreased. Such a slippage control determination map is set for each gear (1st to 6th) of the automatic transmission 3, and the lockup slippage control regions A to C are set for each gear.

The lockup slippage control region A (hereinafter also referred to as region A) shown in FIG. 8 is a lockup slippage control region that is normally set and is free from the problem of booming noise generation. That is, booming noise is not generated even when the vehicle running state (vehicle speed V and throttle opening degree θth) continues to be in the region A for a long period of time.

The lockup slippage control region B (hereinafter also referred to as region B) is a region where booming noise is not generated until the duration for which the vehicle running state (vehicle speed V and throttle opening degree θth) remains in the region B reaches tb (for example, about 10 seconds) and where lockup slippage control is executed until the duration reaches tb. Note that the lockup slippage control is terminated when the duration for which the vehicle running state remains in the region B reaches tb. The lockup slippage control region B is set to be on the lower vehicle speed side and the higher throttle opening degree side relative to the lockup slippage control region A described above.

The lockup slippage control region C (hereinafter also referred to as region C) is a region where booming noise is not generated until the duration for which the vehicle running state (vehicle speed V and throttle opening degree θth) remains in the region C reaches tc (tc<tb, tc: for example, about 3 seconds) and where lockup slippage control is executed until the duration reaches tc. Note that lockup slippage control is terminated when the duration for which the vehicle running state remains in the region C reaches tc. The lockup slippage control region C is set to be on the higher throttle opening degree side relative to the lockup slippage control region B described above.

Figure 9:
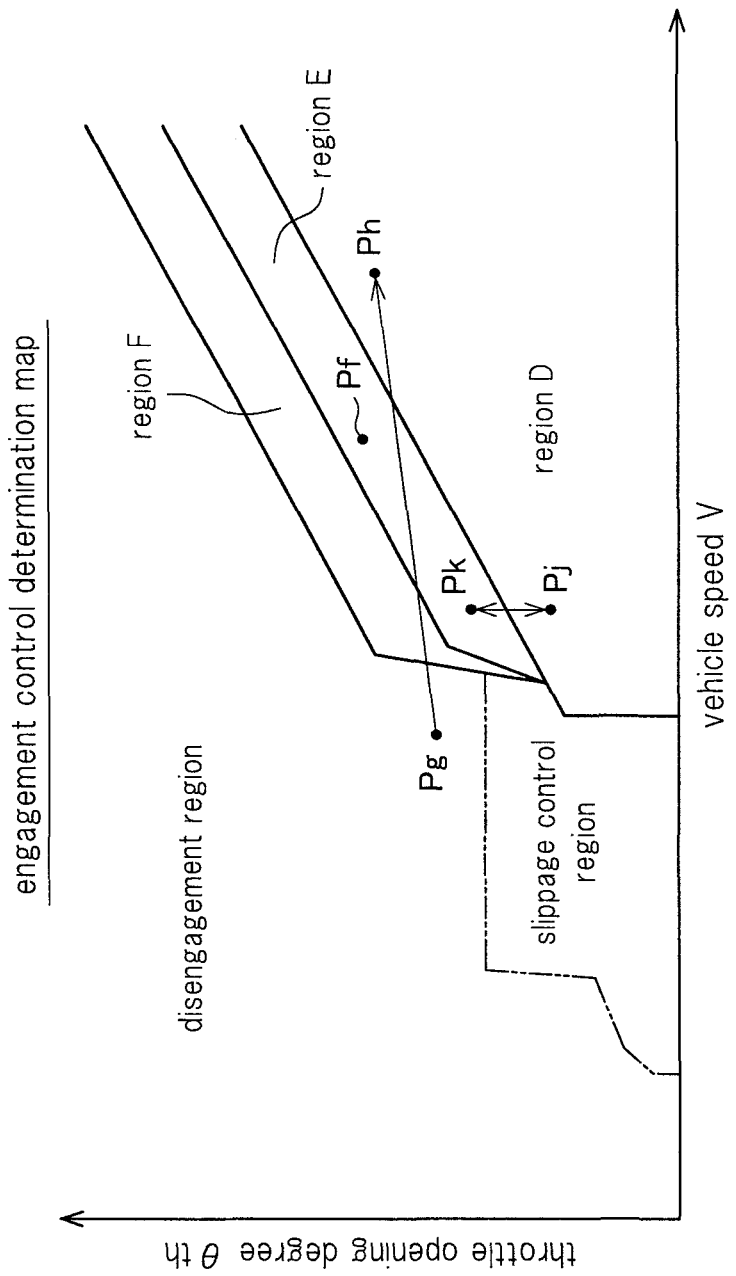
FIG. 9 shows an example of a map for use in lockup engagement control.

The respective regions of the slippage control determination map shown in FIG. 8 use, for example, a vehicle speed V and a throttle opening degree θth as parameters, and it is sufficient to perform experimentation/computation or the like in advance to obtain a region where booming noise is immediately generated due to engine driving (disengagement region) when the lockup clutch 25 is in a state of slipping, a region where booming noise is not generated under any circumstance when the clutch is in a state of slipping, and a region where booming noise is not immediately generated after the vehicle running state enters the region when the clutch is in a state of slipping as well as a time until booming noise is generated after the vehicle running state enters the region, and it is sufficient to set the region A and the disengagement region based on the results. Also, from the results of the experiments/computations or the like, the regions B and C are set and the times tb and tc from entering the respective regions until the lockup slippage control is terminated (booming noise generating timing) are adapted. The regions A to C (slippage control regions) are set on the lower vehicle speed side relative to lockup engagement control regions (regions D to F) as shown in FIG. 9.

The foregoing slippage control determination map shown in FIG. 8 is stored in the ROM 102 of the ECU 100. The ECU 100 determines whether the vehicle running state is in the lockup slippage control region A, the lockup slippage control region B, the lockup slippage control region C, or the disengagement region based on the actual vehicle speed V and the actual throttle opening degree θth using such a slippage control determination map, and executes control to bring the lockup clutch 25 into a state of slipping or disengagement by controlling the lockup control valve 301 so as to perform the operation of the determined region.

In this manner, execution of lockup slippage control using the map shown in FIG. 8 allows a region where lockup slippage control is avoided in conventional control to be actively used to execute lockup slippage control. Specific description will now be given on this point.

First, the region A shown in FIG. 8 is a lockup slippage control region that is normally set, and only the region A is set as a lockup slippage control region in conventional control. Unless the vehicle driving state is in the region A, the lockup clutch 25 is not engaged, failing to sufficiently give the fuel saving effects of the lockup slippage control.

In contrast, with the slippage control determination map shown in FIG. 8, for example, when the vehicle running state is in the region B that is set on the lower vehicle speed side and the higher throttle opening degree side relative to the region A or when a state (for example, a state at point Pa) in which the road load comes to a balance due to a gentle slope continues for a long period of time, the lockup slippage control is executed until the duration of remaining in the region B reaches tb, so fuel economy is improved for the amount corresponding to the execution of the lockup slippage control. In addition, also when the vehicle running state is in the region C, the lockup slippage control is executed until the duration of remaining in the region C reaches tc, and in this case as well the fuel saving effects of the lockup slippage control can be enhanced.

Moreover, for example, when the vehicle running state shifts from point Pb to point Pc in FIG. 8 in a situation of running under acceleration on a flat road (normal running), the lockup slippage control is initiated at the time the determination line (solid line) between the disengagement region and the region B is crossed to enter the region B, and the region B is then traversed quickly to enter the region A, so the lockup slippage control is continuously executed from the time of entering the region B. Thereby, the fuel saving effects of the lockup slippage control can be enhanced.

Furthermore, even when a sudden accelerator operation or repetitive accelerator ON/OFF operations at short intervals are performed while steady-state running in a state at point Pd in FIG. 8, lockup-busy can be prevented. Specifically, even when the throttle opening degree θth is increased by a sudden accelerator operation and the vehicle running state shifts from the region A, for example, a state at point Pd in FIG. 8, to the region B (state at point Pe), the time spent in the region B is short (<tb) and the vehicle running state soon returns to the region A, so the lockup slippage control is continued without being interrupted. Thereby, lockup-busy can be prevented. Also, even when repetitive accelerator ON/OFF operations are performed at short intervals, likewise the lockup slippage control is continued and lockup-busy can be prevented.

As described above, according to the lockup slippage control of this example, the fuel saving effects of the lockup slippage control can be enhanced while inhibiting booming noise generation caused by engine driving. Also, lockup-busy can be prevented.

—Lockup Engagement Control—

First, in this example, when the vehicle running state (such as a vehicle speed V and a throttle opening degree θth) is in a lockup engagement control region, lockup engagement control that brings the lockup clutch 25 into engagement (lockup-on) is executed.

Specifically, whether the vehicle running state is in a lockup engagement control region or a disengagement region is determined based on the actual vehicle speed V and the actual throttle opening degree θth using a map (details will be described later) in which engagement control regions (lockup-on regions) and a disengagement region (lockup-off region) are set using a vehicle speed V and a throttle opening degree θth as parameters, and control to bring the lockup clutch 25 into a state of engagement or disengagement by controlling the lockup control valve 301 is executed so as to perform the operation of the determined region. The actual vehicle speed V is calculated from an output signal of the output shaft revolutions sensor 204, and the actual throttle opening degree θth is calculated from an output signal of the throttle opening degree sensor 202.

Also in such lockup engagement control, due to the same reason as the foregoing lockup slippage control, a small lockup engagement control region is set in conventional control at the expense of enhancement of fuel economy by lockup engagement control, thereby failing to sufficiently give the fuel saving effects of the lockup engagement control To address this point, a feature of this example is the broadening of a region where lockup engagement control is executed by actively using a region where booming noise is generated when the road load comes to a balance due to a slope or the like and running is then continued and where booming noise is not immediately generated even when the vehicle running state is in the region. A specific example thereof will now be described in reference to FIG. 9.

The map shown in FIG. 9 is an engagement control determination map (two-dimensional map) for, using a vehicle speed V and a throttle opening degree θth as parameters, determining if the lockup clutch 25 should be engaged or disengaged according to the vehicle speed V and the throttle opening degree θth. A plurality (3) of lockup engagement control regions D to F are set.

Although only solid determination lines are shown in FIG. 9, hysteresis is to be provided for the determination of the respective regions D to F as with the determination lines indicated by broken lines in the engagement control determination map of FIG. 9. Moreover, such an engagement control determination map is set for each gear (1st to 6th) of the automatic transmission 3, and the lockup engagement control regions D to F are set for each gear.

The lockup engagement control region D (hereinafter also referred to as region D) shown in FIG. 9 is a lockup engagement control region that is normally set and is free from the problem of booming noise generation. That is, booming noise is not generated even when the vehicle running state (vehicle speed V and throttle opening degree θth) continues to be in the region D for a long period of time.

The lockup engagement control region E (hereinafter also referred to as region E) is a region where booming noise is not generated until the duration for which the vehicle running state (vehicle speed V and throttle opening degree θth) remains in the region E reaches te (for example, about 10 seconds) and where lockup engagement control is executed until the duration reaches te. Note that the lockup engagement control is terminated when the duration for which the vehicle running state remains in the region E reaches te. The lockup engagement control region E is set to be on the higher throttle opening degree side relative to the lockup engagement control region D described above.

The lockup engagement control region F (hereinafter also referred to as region F) is a region where booming noise is not generated until the duration for which the vehicle running state (vehicle speed V and throttle opening degree θth) remains in the region F reaches tf (tf<te, tf: for example, about 3 seconds) and where lockup engagement control is executed until the duration reaches tf. Note that the lockup engagement control is terminated when the duration for the vehicle running state remains in the region F reaches tf. The lockup engagement control region F is set to be on the higher throttle opening degree side relative to the lockup engagement control region E described above.

The respective regions of the engagement control determination map shown in FIG. 9 use, for example, a vehicle speed V and a throttle opening degree θth as parameters, and it is sufficient to perform experimentation/computation or the like in advance to obtain a region where booming noise is immediately generated due to engine driving (disengagement region) when the lockup clutch 25 is in an engaged state, a region where booming noise is not generated under any circumstance when the clutch is in an engaged state, and a region where booming noise is not immediately generated after the vehicle running state enters the region when the clutch is in an engaged state as well as a time until booming noise is generated after the vehicle running state enters the region, and it is sufficient to set the region D and the disengagement region are set based on the results. Also, from the results of the experiments/computations or the like, the regions E and F are set and the times te and tf from entering the respective regions until the lockup engagement control is terminated (booming noise generating timing) are adapted.

The foregoing engagement control determination map shown in FIG. 9 is stored in the ROM 102 of the ECU 100. The ECU 100 determines whether the vehicle running state is in the lockup engagement control region D, the lockup engagement control region E, the lockup engagement control region F, or the disengagement region based on the actual vehicle speed V and the actual throttle opening degree θth using such an engagement control determination map, and executes control to bring the lockup clutch 25 into a state of slipping or disengagement by controlling the lockup control valve 301 so as to perform the operation of the determined region.

In this manner, execution of lockup engagement control using the map shown in FIG. 9 allows a region where lockup engagement control is avoided in conventional control to be actively used to execute lockup engagement control. Specific description will now be given on this point.

First, the region D shown in FIG. 9 is a lockup engagement control region that is normally set, and only the region D is set as a lockup engagement control region in conventional control. Unless in the region D, the lockup clutch 25 is not engaged, failing to sufficiently give the fuel saving effects of the lockup engagement control.

In contrast, with the engagement control determination map shown in FIG. 9, for example, when the vehicle running state is in the region E that is set on the higher throttle opening degree side relative to the region D or when a state (for example, a state at point Pf) in which the road load comes to a balance due to a gentle slope continues for a long period of time, the lockup engagement control is executed until the duration of remaining in the region E reaches te, so fuel economy is improved for the amount corresponding to the execution of the lockup engagement control. In addition, also when the vehicle running state is in the region F, the lockup engagement control is executed until the duration of remaining in the region F reaches tf, and in this case as well the fuel saving effects of the lockup engagement control can be enhanced.

Moreover, for example, when the vehicle running state shifts from point Pg to point Ph in FIG. 9 in a situation of running under acceleration on a flat road (normal running), the lockup engagement control is initiated at the time the determination line (solid line) between the disengagement region and the region F is crossed to enter the region F, and the regions F and E are then traversed quickly to enter the region D, so the lockup engagement control is continuously executed from the time of entering the region F. Thereby, the fuel saving effects of the lockup engagement control can be enhanced.

Furthermore, even when a sudden accelerator operation or repetitive accelerator ON/OFF operations at short intervals are performed while steady-state running in a state at point Pj in FIG. 9, lockup-busy can be prevented. Specifically, even when the throttle opening degree θth is increased by a sudden accelerator operation and the vehicle running state shifts from the region D, for example, a state at point Pj in FIG. 9, to the region E (state at point Pk), the time spent in the region E is short (<te) and the vehicle running state soon returns to the region D, so the lockup engagement control is continued without being interrupted. Thereby, lockup-busy can be prevented. Also, even when repetitive accelerator ON/OFF operations are performed at short intervals, likewise the lockup engagement control is continued and lockup-busy can be prevented.

As described above, according to the lockup engagement control of this example, the fuel saving effects of the lockup engagement control can be enhanced while inhibiting booming noise generation caused by engine driving. Also, lockup-busy can be prevented.

Other Embodiments

In an example above, two regions, i.e., regions B and C, are set on the lower vehicle speed side and the higher throttle opening degree side relative to a lockup slippage control region (region A) that is normally set, but as for such regions (regions that are set based on the booming noise generating timing), only 1 may be set, or three or more may be set. Moreover, two regions, i.e., regions E and F, are set on the higher throttle opening degree side relative to a lockup engagement control region (region D) that is normally set, but as for such regions (regions that are set based on the booming noise generating timing), only 1 may be set, or three or more may be set.

In the examples above, a plurality of lockup slippage control regions (regions A to C) and a plurality of lockup engagement control regions (regions D to F) are set using a vehicle speed and throttle opening degree as parameters, but the present invention is not limited thereto, and a plurality of lockup slippage control regions (regions A to C) and a plurality of lockup engagement control regions (regions D to F) may be set using a vehicle speed and a driving force of an engine as parameters. Moreover, a plurality of lockup slippage control regions (regions A to C) and a plurality of lockup engagement control regions (regions D to F) may be set using a vehicle speed and accelerator opening degree as parameters.

In the examples above, for both controls, i.e., lockup slippage control and lockup engagement control, the number of regions that are set takes in consideration a timing at which booming noise that accompanies the driving of an engine is generated, but regions may be set in consideration of a timing at which booming noise that accompanies the driving of an engine is generated only for one of the lockup slippage control and the lockup engagement control.

In the examples above, the present invention was applied to control of a vehicle drive unit equipped with an automatic transmission having six forward gears, but the present invention is not limited thereto, and the present invention is also applicable to control of a vehicle drive unit equipped with a planetary gear automatic transmission having another arbitrary number of gears.

In above examples above, the present invention was applied to control of a vehicle drive unit equipped with a planetary gear transmission that sets a gear ratio using clutches, brakes, and a planetary gear apparatus, but the present invention is not limited thereto, and the present invention is also applicable to control of a vehicle drive unit equipped with a belt-driven stepless transmission (CVT) having a torque converter provided with a lockup clutch.

In the examples above, the present invention was applied to control of a vehicle drive unit equipped with an automatic transmission having a torque converter as a hydraulic transmission apparatus, but the present invention is not limited thereto, and the present invention is also applicable to control of a vehicle drive unit equipped with an automatic transmission having a fluid coupling or a fluid transmission apparatus of another type (having a lockup clutch).

In the examples above, the present invention was applied to control of a vehicle drive unit equipped with a gasoline engine, but the present invention is not limited thereto, and the present invention is also applicable to control of a vehicle drive unit equipped with a diesel engine or another engine.

Furthermore, the present invention is not limited to a vehicle having an FR (front engine/rear drive) configuration, and is also applicable to control of a vehicle having an FF (front engine/front drive) configuration, or a four-wheel drive vehicle.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

This application claims priority on Patent Application No. 2008-260517 filed in Japan on Oct. 7, 2008. The contents thereof are herein incorporated by reference thereto. Also, the contents of the documents cited herein are specifically incorporated herein in their entirety by reference thereto.

INDUSTRIAL APPLICABILITY

The present invention is useful in a controller of a vehicle drive unit equipped with an engine, a transmission, and a lockup clutch, and can increase the frequency of executing lockup slippage control, and therefore is beneficial because the fuel saving effects of the lockup slippage control can be enhanced. Also, the present invention can increase the frequency of executing lockup engagement control and therefore is beneficial because the fuel saving effects of the lockup engagement control can be enhanced.

REFERENCE SIGNS LIST 1 engine
2 torque converter
25 lockup clutch
3 automatic transmission
100 ECU
201 engine revolutions sensor
202 throttle opening degree sensor
205 accelerator opening degree sensor
206 shift position sensor
300 hydraulic control circuit
301 lockup control valve

The invention claimed is:

1. A controller of a vehicle drive unit equipped with an engine, a transmission, and a lockup clutch, the controller comprising:
   a slippage control means for controlling slippage of the lockup clutch,
   wherein a plurality of slippage control regions each having a different timing of booming noise generation that accompanies driving of the engine are set as regions where the slippage control means is performed, and
   in each of the slippage control regions, slippage control is initiated when a vehicle running state enters the slippage control region, and the slippage control is terminated to disengage the lockup clutch when the timing of booming noise generation is reached.

2. The controller of a vehicle drive unit according to claim 1, wherein in each of the slippage control regions, the timing of booming noise generation is a time from when a vehicle running state enters the slippage control region until booming noise is generated.

3. The controller of a vehicle drive unit according to claim 1, wherein the slippage control regions are set using a vehicle speed and a throttle opening degree as parameters, and the slippage control regions are set on a lower vehicle speed side and/or a higher throttle opening degree side relative to a slippage control region wherein booming noise is not generated.

4. The controller of a vehicle drive unit according to claim 1, wherein the slippage control regions are set using a vehicle speed and a driving force as parameters, and the slippage control regions are set on a lower vehicle speed side and/or a greater driving force side relative to a slippage control region wherein booming noise is not generated.

5. A controller of a vehicle drive unit equipped with an engine, a transmission, and a lockup clutch, the controller comprising:
   an engagement control means for controlling engagement of the lockup clutch,
   wherein a plurality of engagement control regions each having a different timing of booming noise generation that accompanies driving of the engine are set as regions where the engagement control means is performed, and
   in each of the engagement control regions, engagement control is initiated when a vehicle running state enters the engagement control region, and the engagement control is terminated to disengage the lockup clutch when the timing of booming noise generation is reached.

6. The controller of a vehicle drive unit according to claim 5, wherein in each of the engagement control regions, the timing of booming noise generation is a time from when a vehicle running state enters the engagement control region until booming noise is generated.

7. The controller of a vehicle drive unit according to claim 5, wherein the engagement control regions are set using a vehicle speed and a throttle opening degree as parameters, and the engagement control regions are set on a lower vehicle speed side and/or a higher throttle opening degree side relative to an engagement control region wherein booming noise is not generated.

8. The controller of a vehicle drive unit according to claim 5, wherein the engagement control regions are set using a vehicle speed and a driving force as parameters, and the engagement control regions are set on a lower vehicle speed side and/or a greater driving force side relative to an engagement control region wherein booming noise is not generated.

* * * * *